*US010852980B1*

United States Patent
Specht et al.

(10) Patent No.: US 10,852,980 B1
(45) Date of Patent: Dec. 1, 2020

(54) DATA MIGRATION TECHNIQUES

(71) Applicant: EMC IP Holding Company LLC, Hopkinton, MA (US)

(72) Inventors: Michael E. Specht, Acton, MA (US); Subin George, Framingham, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 273 days.

(21) Appl. No.: 15/875,097

(22) Filed: Jan. 19, 2018

(51) Int. Cl.
*G06F 12/00* (2006.01)
*G06F 3/06* (2006.01)
*H04L 29/08* (2006.01)

(52) U.S. Cl.
CPC .......... *G06F 3/0647* (2013.01); *G06F 3/0605* (2013.01); *G06F 3/067* (2013.01); *G06F 3/0659* (2013.01); *H04L 67/1097* (2013.01)

(58) Field of Classification Search
CPC ...... G06F 3/0647; G06F 3/0605; G06F 3/067; G06F 3/0659
See application file for complete search history.

(56) References Cited

U.S. PATENT DOCUMENTS 8,301,812 B1 * 10/2012 Riordan ............ G06F 13/4022
710/74
2012/0254554 A1 * 10/2012 Nakajima ............ G06F 3/0607
711/154

OTHER PUBLICATIONS

Violet S. Beckett, et al., U.S. Appl. No. 15/880,940, filed Jan. 26, 2018, "Techniques for Establishing Host Connectivity".

* cited by examiner

*Primary Examiner* — Baboucarr Faal
(74) *Attorney, Agent, or Firm* — Muirhead and Saturnelli, LLC

(57) ABSTRACT

Techniques for performing data migration may include: receiving host information regarding hosts registered on a source data storage system; issuing registration commands from a host to a target data storage system; determining, at the target data storage system in accordance with the registration commands, a host registration table including a corresponding entry for the host, the corresponding entry denoting a host name for the host and initiators of the host that sent the registration commands; and determining a masking view for the host on the target data storage system, the masking view including an initiator group of the initiators of the host that sent the registration commands to the target data storage system, wherein the masking view is used by the target data storage system to determine whether to service received I/O operations.

20 Claims, 9 Drawing Sheets

DATA MIGRATION TECHNIQUES

BACKGROUND

Technical Field

This application generally relates to data storage, and more particularly to techniques used in connection with data migration, such as between data storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by Dell Inc. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives (or more generally data storage devices or physical storage devices), and disk or storage device interface units. The host systems access the storage device through a plurality of channels provided therewith. Host systems provide data and access control information through the channels to the storage device and the storage device provides data to the host systems also through the channels. The host systems do not address the physical storage devices directly, but rather, access what appears to the host systems as a plurality of logical disk units. The logical units may or may not correspond to the actual physical devices or drives.

An application may execute on a host where the application performs I/O (input/output) operations. The host may be able to transmit the data operation to the data storage system over any one or more different paths or multiple paths. Multipathing functionality, such as for path selection and management of the multiple paths, may be handled by a device driver of the host. When an application on the host issues an I/O operation, it may be received by a device driver of the host which facilitates sending and/or receiving transmissions between the application and the data storage system.

SUMMARY OF THE INVENTION

In accordance with one aspect of techniques herein is a method of performing data migration comprising: receiving, on a target data storage system, host information including a list of one or more hosts registered on a source data storage system, wherein data is migrated for one or more logical devices from the source data storage system to the target data storage system; issuing one or more registration commands from a host to the target data storage system; determining, at the target data storage system in accordance with the one or more registration commands, a host registration table including a corresponding entry for the host, the corresponding entry denoting a host name for the host and one or more initiators of the host that sent the one or more registration commands to the target data storage system; and determining a masking view for the host on the target data storage system, the masking view including an initiator group of the one or more initiators of the host that sent the one or more registration commands from the host to the target data storage system, wherein the masking view is used by the target data storage system to determine whether to service received I/O operations. The method may include: migrating data for a first logical device from the source data storage system to the target data storage system; receiving, at the target data storage system from a first initiator of the host, an I/O command directed to the first logical device; and determining, in accordance with the masking view, whether to service the I/O command. The masking view may indicate the I/O command is allowable and serviced by the target data storage system. The first initiator may be included in the initiator group of the masking view, the first logical device may be included in a storage group of the masking view, and the I/O command may be received at a target port of the target data storage system and the target port may be included in a target port group of the masking view. The method may include performing verification processing including determining, in accordance with the host information identifying hosts registered on the source data system and in accordance with the host registration table of the target system, whether each host registered on the source data storage system is also registered on the target data storage system. The verification processing may further comprise determining, in accordance with the host information identifying hosts registered on the source data system and in accordance with the host registration table of the target system, whether the host registered on the target data storage system is also registered on the source data storage system. Each of the one or more registration commands from the host to the target data storage system may include the host name for the host. The verification processing may include determining whether the host name for the host as included the host registration table of the target data storage system matches a host name included in the host information identifying hosts registered on the source data system. The verification processing may include ensuring that each host registered on both the target data storage system and the source data storage system has successfully discovered the one or more logical devices migrated from the source data storage system to the target data storage system whereby said each host has successfully issued commands to the one or more logical devices over all accessible paths between the host and the target data storage system.

In accordance with another aspect of techniques herein is a computer readable medium comprising code stored thereon that, when executed, performs a method of performing data migration comprising: receiving, on a target data storage system, host information including a list of one or more hosts registered on a source data storage system, wherein data is migrated for one or more logical devices from the source data storage system to the target data storage system; issuing one or more registration commands from a host to the target data storage system; determining, at the target data storage system in accordance with the one or more registration commands, a host registration table including a corresponding entry for the host, the corresponding entry denoting a host name for the host and one or more initiators of the host that sent the one or more registration commands to the target data storage system; and determining a masking view for the host on the target data storage system, the masking view including an initiator group of the one or more initiators of the host that sent the one or more registration commands from the host to the target data storage system, wherein the masking view is used by the target data storage system to determine whether to service received I/O operations. The method may include: migrating data for a first logical device from the source data storage system to the target data storage system; receiving, at the target data storage system from a first initiator of the host, an I/O command directed to the first logical device; and determining, in accordance with the masking view, whether to service the I/O command. The masking view may indicate the I/O command is allowable and serviced by the target data storage system. The first initiator may be included in the initiator group of the masking view, and the first logical device may be included in a storage group of the masking view. The I/O command may be received at a target port of the target data storage system and the target port may be included in a target port group of the masking view. The method may include performing verification processing including: determining, in accordance with the host information identifying hosts registered on the source data system and in accordance with the host registration table of the target system, whether each host registered on the source data storage system is also registered on the target data storage system. The verification processing further may include determining, in accordance with the host information identifying hosts registered on the source data system and in accordance with the host registration table of the target system, whether the host registered on the target data storage system is also registered on the source data storage system. Each of the one or more registration commands from the host to the target data storage system may include the host name for the host. The verification processing may include determining whether the host name for the host as included the host registration table of the target data storage system matches a host name included in the host information identifying hosts registered on the source data system. The verification processing may include ensuring that each host registered on both the target data storage system and the source data storage system has successfully discovered the one or more logical devices migrated from the source data storage system to the target data storage system whereby said each host has successfully issued commands to the one or more logical devices over all accessible paths between the host and the target data storage system.

In accordance with another aspect of techniques herein is a system comprising: one or more processors; and a memory comprising code stored thereon that, when executed by at least a first of the one or more processors, performs a method of data migration comprising: receiving, on a target data storage system, host information including a list of one or more hosts registered on a source data storage system, wherein data is migrated for one or more logical devices from the source data storage system to the target data storage system; issuing one or more registration commands from a host to the target data storage system; determining, at the target data storage system in accordance with the one or more registration commands, a host registration table including a corresponding entry for the host, the corresponding entry denoting a host name for the host and one or more initiators of the host that sent the one or more registration commands to the target data storage system; and determining a masking view for the host on the target data storage system, the masking view including an initiator group of the one or more initiators of the host that sent the one or more registration commands from the host to the target data storage system, wherein the masking view is used by the target data storage system to determine whether to service received I/O operations. The method may include: migrating data for a first logical device from the source data storage system to the target data storage system; receiving, at the target data storage system from a first initiator of the host, an I/O command directed to the first logical device; and determining, in accordance with the masking view, whether to service the I/O command. The masking view may indicate the I/O command is allowable and serviced by the target data storage system. The first initiator may be included in the initiator group of the masking view, the first logical device may be included in a storage group of the masking view, and the I/O command may be received at a target port of the target data storage system. The target port may be included in a target port group of the masking view. The method may include performing verification processing comprising: determining, in accordance with the host information identifying hosts registered on the source data system and in accordance with the host registration table of the target system, whether each host registered on the source data storage system is also registered on the target data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
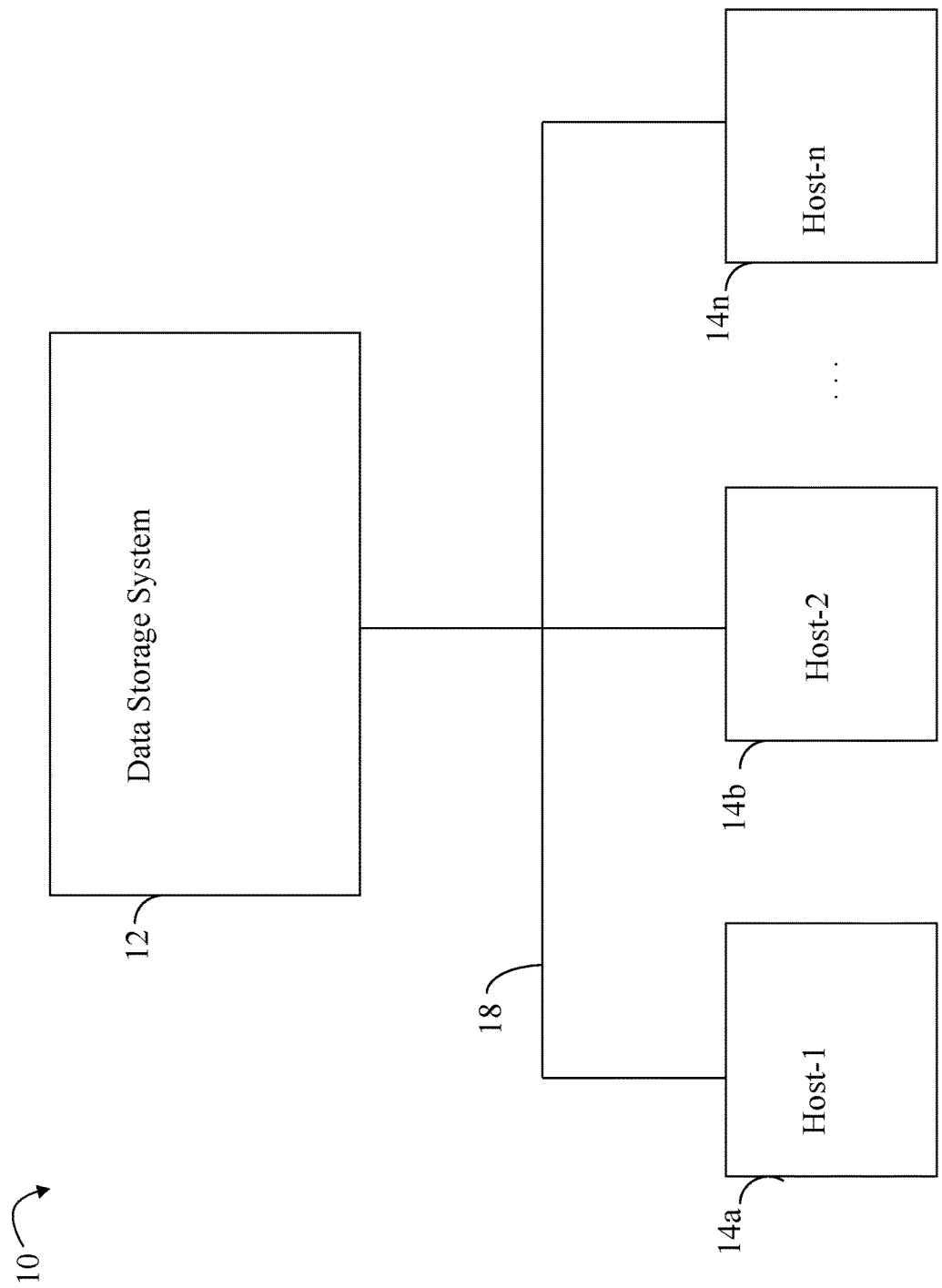
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14*a*-14*n* through communication medium 18. In this embodiment of the system 10, the N hosts 14*a*-14*n* may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as Symmetrix® VMAX® data storage system by Dell Inc., as well one or more other data storage systems as may vary with the embodiment.

Figure 2A:
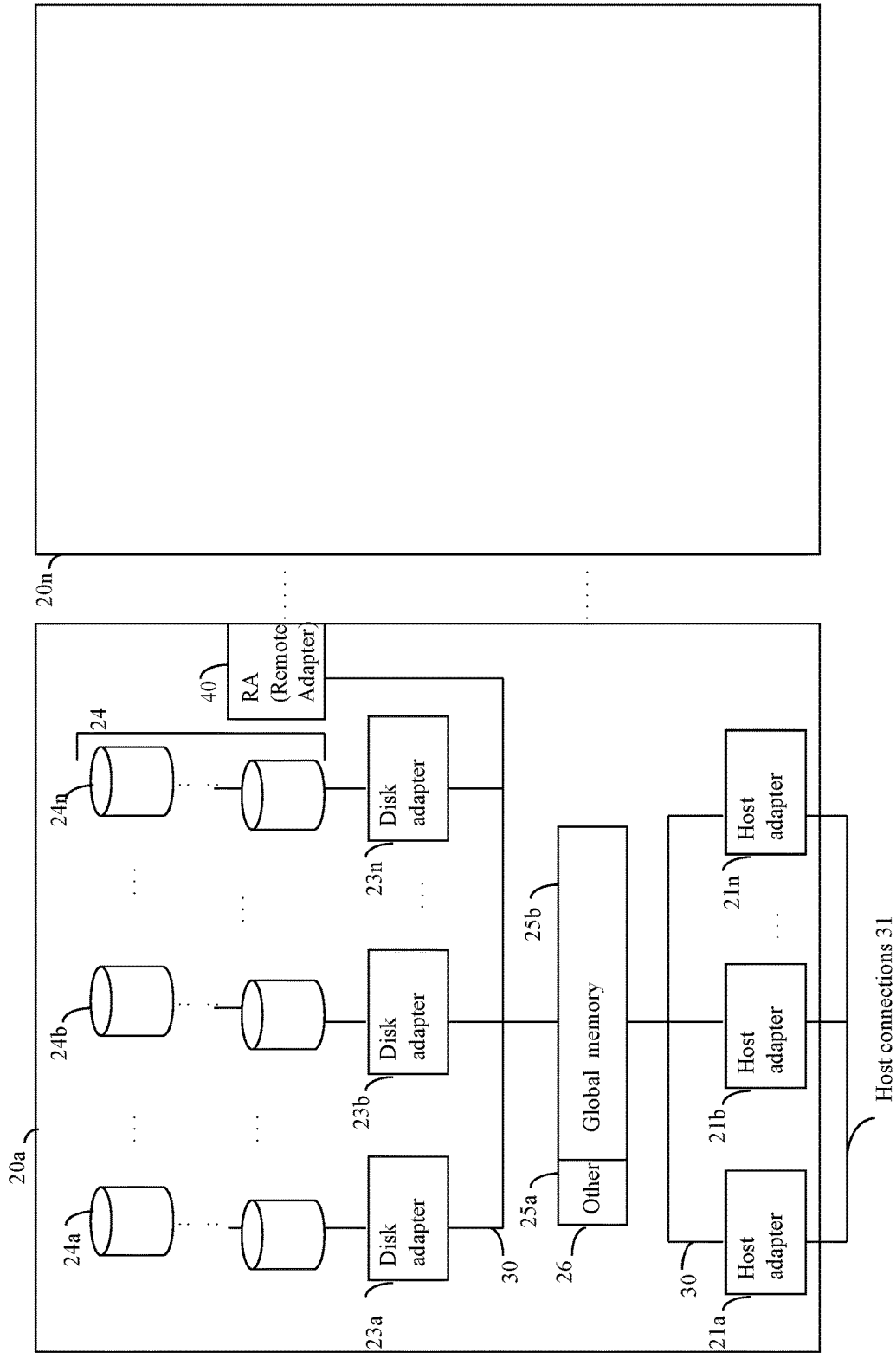
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices (e.g., SLC (single level cell) flash, MLC (multi-level cell) flash, TLC, (tri-level cell) flash) or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host (e.g., receive host I/O commands and send responses to the host) may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA physically accesses the back-end non-volatile storage devices, such as physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as the non-volatile physical storage device (PDs of 24) accessed by a DA. In connection with reads, processing may include first looking to see if the requested read data is in cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time. If the requested read data is not in cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management techniques may be used to maintain the cache, for example, such as is determining how long data remains in cache, whether to prefetch data, selecting data stored in the cache for eviction, and the like.

Figure 2B:
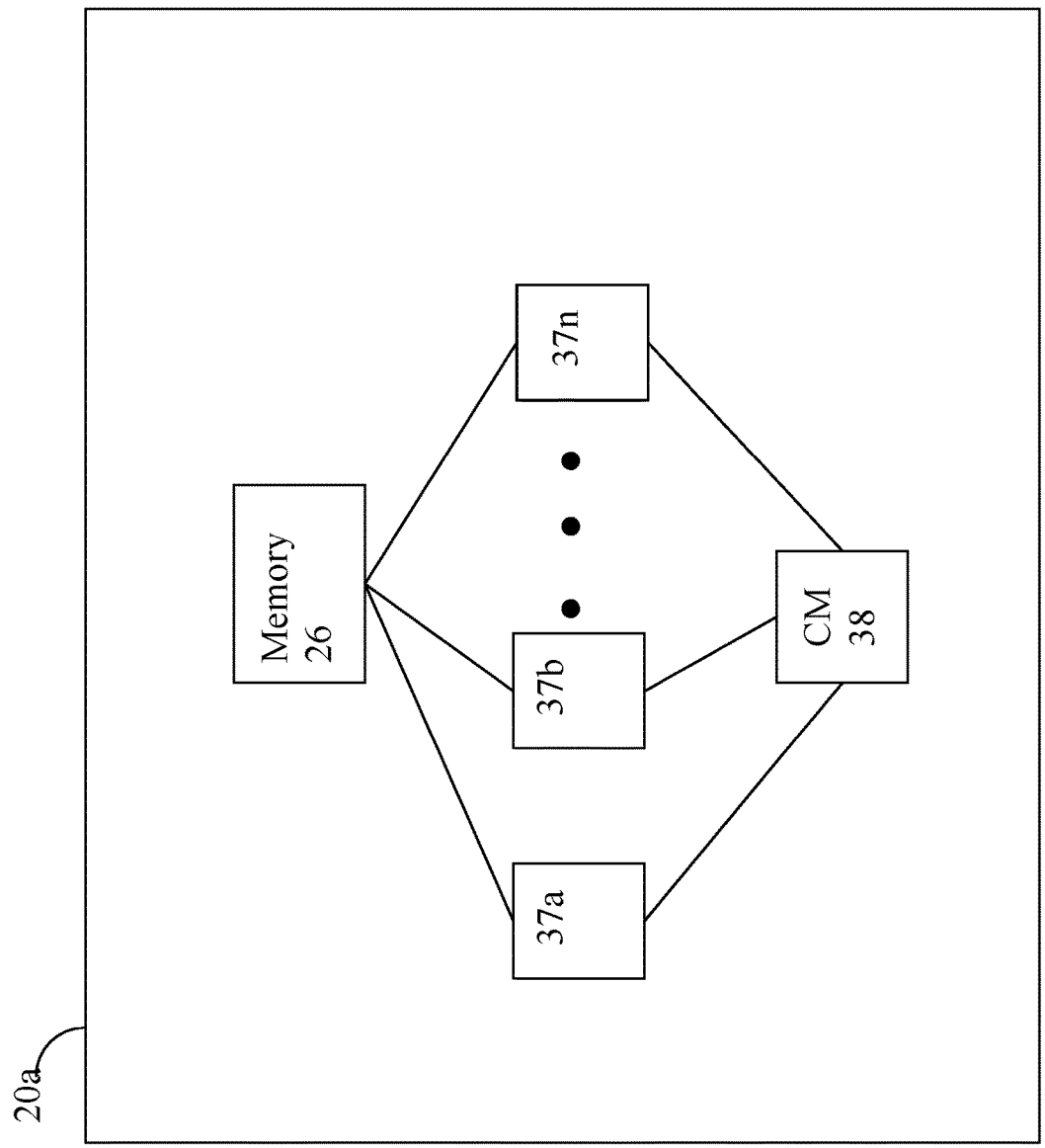
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system.

Figure 3:
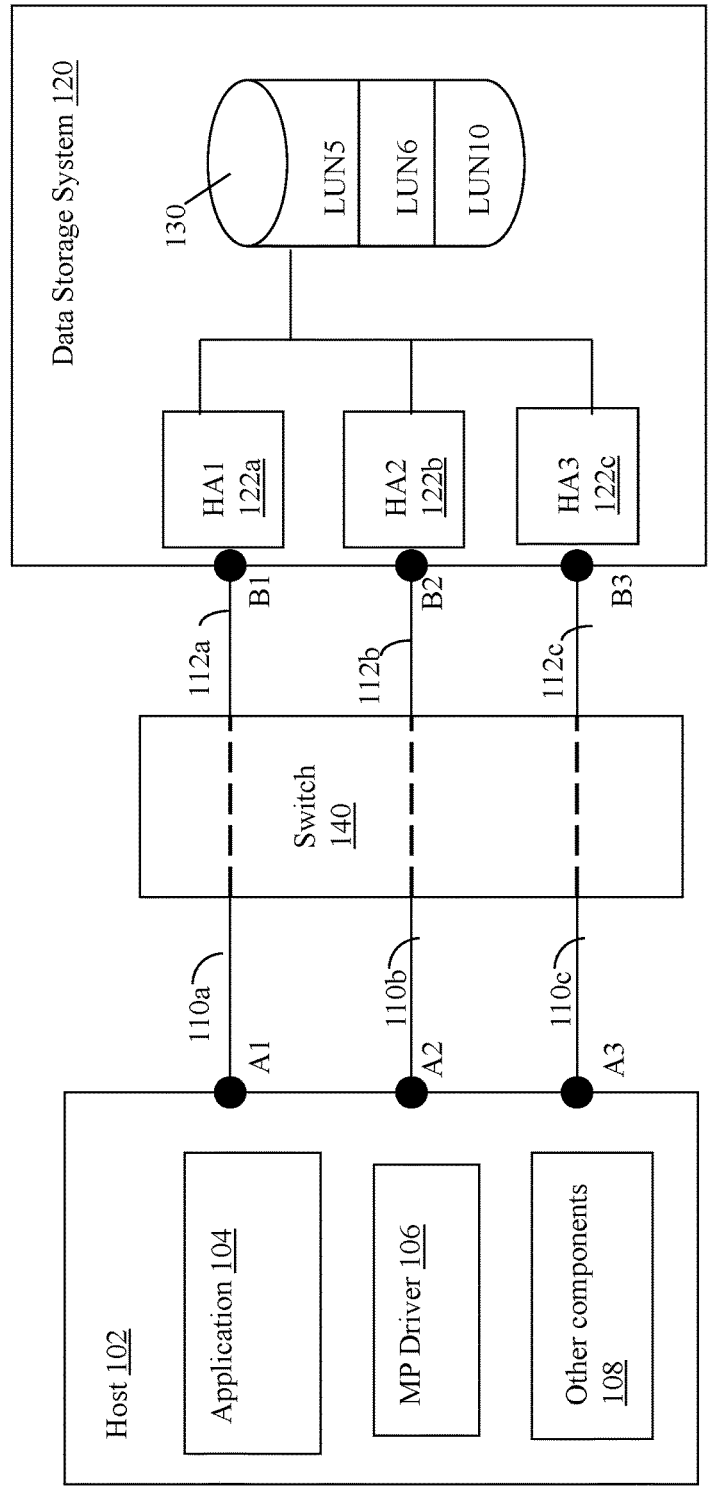
FIGS. 3 and 6 are examples of systems and components that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The MP driver 106 may be included in a commercially available product such as, for example, Dell® EMC PowerPath® software by Dell Inc. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC or SCSI driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4:
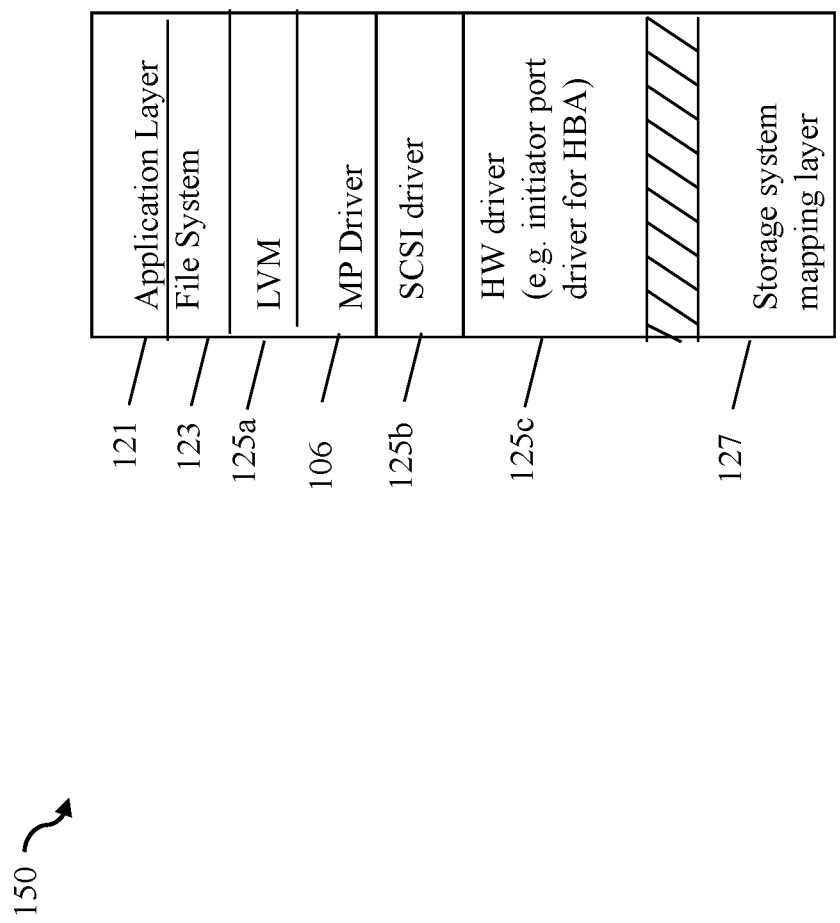
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3.

In an embodiment in accordance with techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC PowerPath® software. Functionality for performing multipathing operations by multipathing software, such as the MP driver 106, may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI driver 125b and a hardware (HW) driver 125c. The SCSI driver 125b may handle processing of a received I/O request from the MP driver 106 such as related to forming a request in accordance with the SCSI standard. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write commands or operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

In an embodiment of a data storage system in accordance with techniques herein, components such as HAs, DAs, and the like, as discussed herein may be implemented using one or more "cores" or processors each having their own memory used for communication between the different front end and back end components rather than utilize a global memory accessible to all storage processors.

Although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a logical block address (LBA) within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In at least one embodiment in accordance with techniques herein, zoning may be used in combination with masking. Generally, zoning specifies connectivity between the host and data storage system and masking may be used to further control or limit access to particular LUNs.

Masking may be generally characterized as a process performed on the data storage system that indicates which of the LUNs are exposed over which target ports to which initiators. For example target port B1 may be configured to have 100 LUNs attached or mapped to it where the 100 attached LUNs may be potentially exposed to any initiator. The masking information (also referred to herein as mask information, LUN mask information or masking views (MVs)) provides the HAs and their target ports information identifying which of the 100 LUNs are exposed over which of the target ports to which host initiators. For example, with reference to FIG. 3, assume there are 100 LUNs attached or mapped internally in the data storage system to target port B1. In this example, masking information may indicate that only 3 of the 100 LUNs—specifically LUNs 5, 6 and 10—are exposed to each of the initiators A1, A2 and A3 over each of the target ports B1, B2 and B3.

In at least one embodiment in accordance with techniques herein and with reference back to FIG. 3, zoning may be performed with respect to the switch 140, or more generally, network fabric or switching fabric, whereby connectivity between the host 102 and data storage system 120 is specified. In a SAN, zoning may be performed for selectively allowing access to data only to certain users. Essentially, zoning allows an administrator to control who (e.g., which initiator(s)) can see what target ports in a SAN. Using zoning in combination with LUN masking as described herein provides control over who (e.g., what initiator(s)) can see what data/devices (e.g., LUNs) over which target ports in a SAN. Zoning is generally known in the art. Zones may be created by grouping world wide port names (WWPNs) of host interfaces (e.g., initiators) and data storage system interfaces (e.g., target ports) into zones. The set of zones created may be placed into a zone set which is then activated on the fabric, such as the switching fabric to define the logical connections between host initiators and target ports of the data storage system. Zoning may be performed by issuing requests or commands to the switch. For example, with reference back to FIG. 3, a host initiator may be host initiator port A3 which is zoned to target ports B1, B2 and B3 of the data storage system. Similarly, host initiator ports A1 and A2 may each be zoned to target ports B1, B2 and B3 of the data storage system. Once such zones are created and activated, the various affected ports may be notified by the switching fabric (e.g., via RSCN or registered state change notification in FC protocol) and can perform processing to discover the zoning changes and log into the switch to establish any new connections.

Thus, zoning may be generally characterized as defining logical connections providing connectivity between the various host initiators and target ports. Existing connectivity including a set of logical connections between the host initiators and target ports may be modified by accordingly modifying existing zoning information currently activated or in use by the switching fabric. Such modification may include any of creating a new zone, modifying and/or replacing zoning information of an existing zone, deleting an existing zone, and the like. A zoning modification may be made by issuing appropriate requests to the switching fabric.

In an embodiment in accordance with techniques herein using zoning and masking, zoning of switch 140 may be performed to define the connectivity between the host 102 and data storage system 120 through the switch 140. Masking may then be used by the data storage system to further control which LUNs of the data storage system 120 are exposed, accessible or visible, through which of the target ports B1-B3, to each of the initiators 110a-c of the host 102.

In some existing systems, after zoning of the switch is performed to define the connectivity between the host and data storage system, masking information may be specified and used by the data storage system 120. The masking information specifies which host initiators have access to which LUNs over which target ports of the data storage system 120.

In at least one embodiment in accordance with techniques herein, processing may be performed to define and create masking views specifying masking information. Such techniques may be performed after zoning of the switch (e.g., switching or network fabric) is performed to define connectivity between the host and data storage system. In at least one embodiment, a masking view (MV) may be created for each host. Each MV specified for a host may identify what LUNs are accessible to which initiators of the host over which of the target ports of the data storage system. Thus, each instance of an MV associated with a particular host may include a port group (PG), an initiator group (IG), and a device group or storage group (SG). The PG may identify one or more target ports of the data storage system. The IG may identify one or more initiators of the host associated with the MV instance. The SG may identify one or more LUNs. In this manner, the MV associated with a host may denote that the LUNs of the SG are accessible to the initiators (of the host) of the IG over target ports of the PG.

In one embodiment, each initiator and each target port of the data storage system may have an associated WWPN and the masking information identifies which initiator WWPNs are allowed to access particular LUNs on each target port WWPN of the data storage system. In the MV for a host, the IG may identify the WWPNs of host initiators and the PG may identify the WWPNs of target ports of the data storage system.

In at least one embodiment in accordance with techniques herein, each host may be uniquely identified using an associated HOST NAME. The HOST NAME may be a customer-specified, human-readable name, such as an alphabetic or alphanumeric string providing an easier way for a human to reference or uniquely identify a particular host in a customer system (e.g., such as a customer SAN). In such an embodiment, the MV for a particular host may be associated with, or mapped to, the host's HOST NAME. In this way, the MV of a host may be indexed and accessed using the HOST NAME. Additionally, the HOST NAME may be mapped, indexed, or associated with one or more IP addresses (e.g., network addresses) of the host. An embodiment may therefore provide access to a host's MV through the host's HOST NAME and/or one or more of the host's network addresses that are mapped or associated with the HOST NAME.

Figure 5:
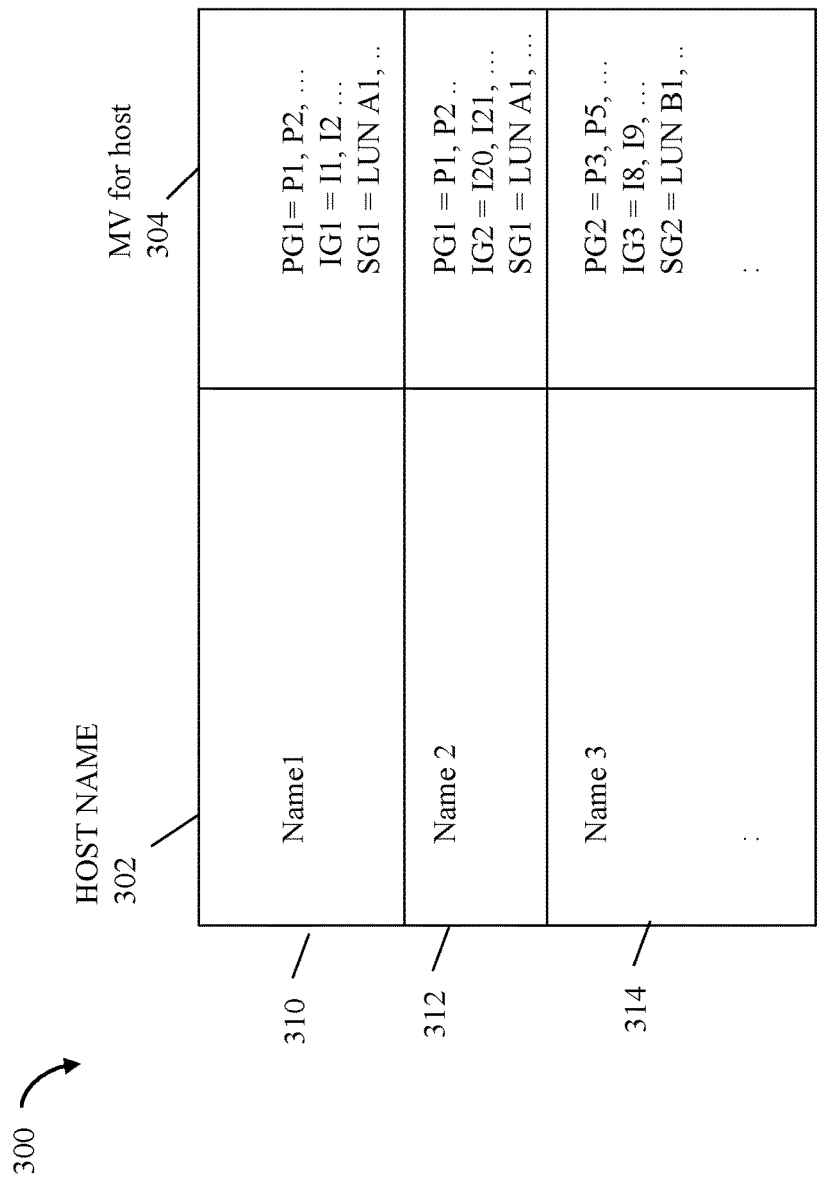
FIG. 5 is an example of information that may be included in masking view defined for hosts in an embodiment in accordance with techniques herein.

Referring to FIG. 5, shown is an example of masking information that may be created and used in an embodiment in accordance with techniques herein. In the example 300, shown is a table of MVs for a plurality of hosts. Each row of the table denotes an MV instance in column 304 configured for a particular host identified in column 302 of the same row. The table 300 may index or provide access to MVs using the host's unique HOST NAME (column 302) as described elsewhere herein. For example, consider an embodiment in which the table 300 is indexed and accessed by HOST NAME in column 302. (e.g., Each host's HOST NAME denoted in column 302 uniquely identifies a particular host). Generally, the example 300 uses the notation PGn, n being an integer greater than 0, to identify an instance of a PG; uses the notation IGn to identify and instance of an IG; and uses the notation SGn to identify an instance of a SG. In a PG, Pn may denote a target port WWPN. In an IG, In may denote an initiator WWPN.

Row 310 may denote a first host having a HOST NAME of Name 1 (as in column 302 of row 310) with an MV as specified in column 304 of row 310. As illustrated in column 304 of row 310, the first host has a first MV including port group PG1, initiator group IG1, and storage group SG1. Row 312 may denote a second host having a HOST NAME of Name 2 (as in column 302 of row 312) with an MV as specified in column 304 of row 312. As illustrated in column 304 of row 312, the second host has a second MV including port group PG1, initiator group IG2, and storage group SG1. Note that SGs and PGs may be defined and reused in different MV instances for different hosts. For example, PG1 may be defined as a set of target ports of the data storage system and SG1 may be defined as a set of particular LUNs where both PG1 and SG1 are used in the MVs of rows 310 and 312. Row 314 may denote a third host having a HOST NAME of Name 3 (as in column 302 of row 314) with an MV as specified in column 304 of row 314. As illustrated in column 304 of row 314, the third host has a third MV including port group PG2, initiator group IG3, and storage group SG2.

Described below are techniques that may be used in at least one embodiment to initially and automatically create masking information as included in the MVs for hosts where such MVs may be used to initially populate table 300 of FIG. 5. At a later point in time, a user or customer may modify the masking information in table 300 of FIG. 5.

In an embodiment in accordance with techniques herein with reference back to FIG. 3, the network and illustrated components may be in the process of initializing and starting up whereby the zoning has completed and the host may be in the process of performing its initialization processing. Once zoning of the switch 140 is complete whereby the host 102 has connectivity defined by such zoning to the data storage system 120, the host 102 (as part of its initialization) may send host registration commands to the data storage system 120. More specifically, the host 102 may send a host registration command on each path or unique combination of initiator (e.g., host HBA) and target port. For example, assume that connectivity has been zoned in the switch 140 for paths between each unique pair of initiator and target port or 9 paths zoned between the host and data storage system 120 as follows: A1-B1, A1-B2, A1-B3, A2-B1, A2-B2, A2-B3, A3-B1, A3-B2, and A3-B3. The host 102 (e.g., the MPIO driver of the host 102) may send a host registration command from the host 102 to the data storage system 120 over each of the foregoing 9 paths to register the host on each of the target ports B1, B2, B3 of the data storage system. In at least one embodiment, the host registration command may be a SCSI command directed to a target port of the data storage system. It should be noted that the host registration command may be directed to a target port of the data storage system rather than a LUN because, at this point in system startup, no LUNs may be defined or have storage provisioned on the data storage system. As an alternative, an embodiment may direct the host registration command issued from a host initiator to a target port to a particular LUN and thereby register that particular path (e.g., initiator and target port) for use with the particular LUN specified in the registration command.

Each registration command sent from an initiator HBA port of the host 102 includes registration information including the HOST NAME uniquely identifying the particular host that sent the registration command. The registration command may also include other information regarding the host, such as the particular host operating system and the like. Additionally, the data storage system 120 receiving the host registration command knows the WWPN of the initiator which sent the registration command. In at least one embodiment, the receiving target port of the data storage system may be provided the WWPN of the sending host initiator as part of information transmitted with the registration command. An embodiment in accordance with techniques herein may automatically and programmatically (e.g., by executing code) may define the IG for the MV for host 102 using the registration information transmitted with the host registration commands and knowing the WWPNs of the host initiators that sent the host registration commands. More specifically, processing may be performed on the data storage system 120 to process the registration information received with host registration commands to form an IG for the host 102 having the HOST NAME. For each host registration command received from an initiator, where the registration information of the command identifies HOST NAME as the sending host including the initiator, that initiator may be included in the IG for the host 102. In this manner, processing may be performed, such as on the data storage system, to automatically form sets of IGs by grouping and associating initiator WWPNs having a common or the same HOST NAME.

At this point, the IG for host 102 may be automatically formed as described above and associated with the HOST NAME of the host 102. Additionally, processing may also be automatically performed to define a PG for host 102 and its associated IG where the PG includes the one or more target ports of the data storage system which received one of the host registration commands from an initiator of the IG. For example, as noted above with reference back to FIG. 3, 9 host registration commands may sent from the host 102 to the data storage system 120. The IG for MV of host 102 may include A1, A2 and A3 since each of these initiators sent 3 host registration commands to each of the 3 target ports B1, B2 and B3, and registration information of such commands identified the same HOST NAME (uniquely identifying host 102) as the host including the initiators that sent the commands. The PG for the MV of host 102 may be the set of target ports of the data storage system that received a host registration command sent by one of the initiators in the IG for host 102. In this example, the 3 target ports B1, B2, and B3 form the PG for host 102.

In at least one embodiment in accordance with techniques herein such as described above in connection with FIG. 3, each initiator of host 102 may be zoned to use the same set of target ports B1, B2 and B3. However, it may be that not all initiators of the IG for the host actually register with, or issue host registration commands to, the same set of target ports of the data storage system. In this latter case, even if not all initiators of the IG do not actually register on the same set of target ports, the PG may be formed as the set which is the union of all target ports that receive a registration command from an initiator of the IG. Note that in such a case, if a particular target port of the PG is not zoned for a particular initiator, then the particular initiator will be restricted and only allowed to send commands to its zoned target ports.

At this point, a MV may be defined for the host 102 where the MV includes the IG and PG formed as described above based on the host registration commands received on the data storage system. The SGs for the MVs also are specified using any suitable technique. For example, in at least one embodiment in which each of the host registration commands issued from a host initiator to a target port is directed to a particular LUN, an SG may be formed using the LUNs specified in each of the registration commands. For example, a first host registration command may be issued over path A1-B1 to LUN 5 and a second host registration command may be issued over path A1-B1 to LUN 6. Using the foregoing, the IG may include A1, the PG may include B2 and the SG may include LUNs 5 and 6.

As a variation to the foregoing, an embodiment may provide for a user to specify or define SGs manually, such as using data storage system management software. As yet another option, an embodiment may automatically and initially define a default SG for each MV whereby the default SG may include a single default LUN. Subsequently, the user may modify the default SG created for an MV. In this manner, the data storage system 120 may use an MV for a host to further limit access over one or more particular paths to one or more particular LUNs included in an SG.

With reference back to FIG. 3, the data storage system 120 may be an existing data storage system currently in use by a data storage customer. At some point in time and for any one or more reasons, the customer may desire to migrate data from the existing, source data storage system 120 to another second target data storage system. For example, the second target data storage system may be a newer data storage system than the existing data storage system. The customer may perform the migration, for example, to retire the existing data storage system whereby the second target data storage system will replace the existing data storage system. In at least one embodiment, the migration may be characterized as a non-disruptive migration (NDM) from the perspective of the host or other consumer of the data stored on the existing data storage system. In at least one embodiment, the NDM migration may be performed in an automated manner using a migration controller that migrates the LUNs from the source to the target data storage system. Prior to cutover by the host to use the target data storage system and while the host is still accessing data of the source data storage system, the NDM may ensure that the host has discovered and is able to access data of the migrated LUNs on the target data storage system. The NDM may be performed while the host is accessing the LUNs being migrated (e.g. host issues I/Os to the LUNs) and host access to the data is not disrupted. Once the migration of the LUNs to the target system is complete, a cutover may be performed where the host uses the migrated copy of the LUNs stored on the target system rather than the source system (e.g., the source system may be taken offline and the host no longer issues I/Os to the source data storage system). Thus, from the host perspective, the NDM provides the host with uninterrupted and continuous access to the host data as stored on the LUNs of the data storage system before, during and after the migration has completed.

At least some existing migration solutions have an undesirable restriction in that the same host initiators are used in connection with connectivity to both the source and target data storage systems. Thus, such existing migration solutions may not provide an automated way for a customer to add new host initiators to connectivity used to communicate solely with the new target data storage system. Rather, the existing migration solution may automatically provide connectivity between the host and the target system and also between the host and the source data storage system using only the same host initiators. Subsequent to the migration and not under automated control of the migration controller, a user may modify connectivity between the host and the target system to use only the new host initiators, such as using manual configuration techniques. Furthermore, such existing techniques may not provide and ease-of-use way for the customer to verify that the host, after the migration has completed, is able to issue I/Os and other commands to the LUNs on the target data storage system over the new paths using the new host initiators. For example, an existing technique may be used where the customer manually performs verification processing to check that the new data storage system and LUNs are visible and accessible to the host over desired paths. As an alternative, an existing technique may have the migration controller communicate with the host to perform such verification processing which may undesirably require that the controller use host credentials and authentication information.

Described in following paragraphs are techniques that may be used in connection with NDM performed automatically under the control of a migration controller whereby newly added host initiators may be used to communicate with the target system (e.g., such added initiators are not used in connection with host-source data storage system connectivity).

Figure 6:
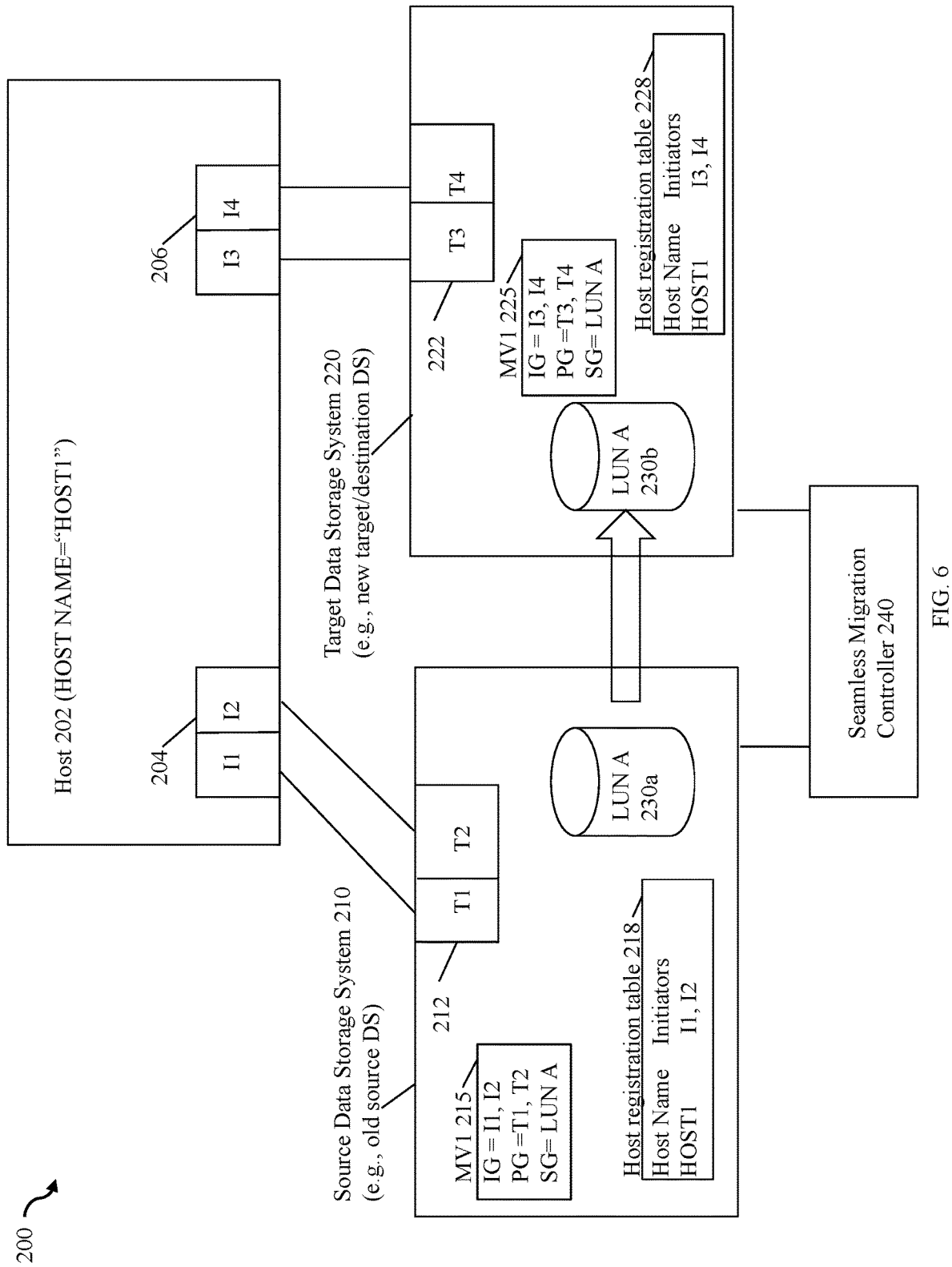

To further illustrate, reference is made to the example 200 of FIG. 6. The example 200 includes host 202, source data storage system 210, target data storage system 220 and seamless migration controller (also referred to herein as migration controller) 240. The host 202 is similar to other hosts, such as host 102, as described herein. The data storage systems 210 and 220 are similar to other data storage systems as described herein. In at least one embodiment, the migration controller 240 may perform processing to control the migration of data, such as LUNs, from the source system 210 to the target system 220. In this example, for simplicity, only a single LUN A 230a is illustrated in the source data storage system 210 for migration although in actual systems there may be many more LUNs. Element 230a denotes the copy of LUN A as stored on the source system 210 which is migrated to the target system 220. Element 230b denotes the migrated copy of LUN A as stored on the target system 220. In this example, the source data storage system 210 may be configured to have an MV for the host 202 such as using host registration commands described elsewhere herein. The host 202 may have a HOST NAME of HOST1 and may issue such host registration commands to the source data storage system 210 to define at least the IG and PG of the MV1 215 for host 202. Consistent with discussion elsewhere herein, the SG of MV1 215 may be formed using host registration commands directed to LUN A and/or manually having a user-specified SG.

The data storage system 210 may also include a host registration table 218 which includes each HOST NAME and associated host initiators (e.g., WWPNs of initiators for the particular HOST NAME). An embodiment may alternatively combine the information of 215 and 218 into a single table such as illustrated in FIG. 5. However, for simplicity of illustration, the information of the host registration table 218 is separated from the information of MV1 215.

At a first point in time prior to commencing the migration, the customer's site may only include the host 202 and source system 210. The source system 210 includes target ports T1 and T2 of 212. At this first point in time, the host 202 may only include the initiators I1 and I2 of 204 where the host 202 issues I/Os to LUN A 230a over a first path I1-T1 and second path I2-T2. Initiators 204 and target ports 212 are respectively similar to initiators A1-A3 and target ports B1-B3 of FIG. 3. The MV1 215 for HOST1 (host 202) includes IG=I1, I2; PG=T1, T2 and SG=LUN A. The host registration table 218 indicates that host 202 (HOST NAME=HOST1) includes initiators I1 and I2. Thus, the host registration commands may be used on the source data storage system 210 to identify with host initiators (e.g., I1, I2) are associated with the same common HOST NAME, HOST1.

At a second subsequent point in time, the customer's site may be modified to also include the target data storage system 220, seamless migration controller 240 and new host initiators I3 and I4 of 206. The target system 220 includes target ports T3 and T4 of 222 which are similar to target ports B1-B3 of FIG. 3. Initiators 206 are similar to host initiators A1-A3 of FIG. 3. At this second point in time, zoning between the host 202 and target data storage system 220 may include paths I3-T3 and I4-T4.

The migration controller 240 may perform processing to migrate LUN A 230a from the source data storage system 210 to the target data storage system 220. The controller 240 may provision storage on the target system 220 for LUN A, as denoted by 230b, and copy the data from LUN A 230a to LUN A 230b. Elements 230a and 230b may be configured as the same LUN or logical device LUN A from the perspective of the host 202. For example, both 230a and 230b may be configured to have the same LUN identifier or other information used by the host 202 in uniquely identifying each LUN. Additionally, the controller 240 may orchestrate or control over which path(s) the host 202 is able to access the LUN A depending on the state of the migration and other processing performed by the controller.

In a manner similar to that as described above, the host 202 may issue host registration commands over all zoned paths from the host 202 to the target data storage system 220. In this example, the target data storage system 220 may be configured to have an MV1 225 for the host 202 such as using the received host registration commands described elsewhere herein. The host 202 may have a HOST NAME of HOST1 and may issue such host registration commands to the target data storage system 220 to define at least the IG and PG of the MV1 215 for host 202. Consistent with discussion elsewhere herein, the SG of MV1 225 may be formed using host registration commands directed to LUN A and/or manually having a user-specified SG.

The target data storage system 220 may also include a host registration table 228 which includes each HOST NAME and associated host initiators (e.g., WWPNs of initiators for the particular HOST NAME). An embodiment may alternatively combine the information of 225 and 228 into a single table such as illustrated in FIG. 5. However, for simplicity of illustration, the information of the host registration table 228 is separated from the information of MV1 225. As illustrated, the host registration table 228 indicates that host 202, HOST1, includes initiators 13 and 14.

In accordance with techniques herein, the migration controller 240 may perform verification processing which includes importing, from the host registration table 218 of the source data storage system 210, host information for all registered hosts of the source data storage system 210. The migration controller 240 may traverse the list of HOST NAMES from the table 218 to ensure that the same hosts have also registered on the target data storage system 220. For example, the table 218 indicates that a host with HOST NAME=HOST1 previously registered on the source system 210. The controller performs processing to ensure that the host registration table 228 of the target data storage system includes a corresponding or matching HOST NAME for each registered HOST NAME in table 218 of the source system 210 with respect to the one or more MVs being migrated (e.g., it may be that not all SGs of the source system 210 are migrated to the target system 220. Thus, the controller performs processing as described herein with respect to those SGs, and thus associated MVs, migrated). In this example, the controller 240 ensures that HOST 1, as included in table 218 of source system 210, is also registered on the target system 220, whereby table 228 is traversed to ensure that it includes an entry for HOST 1. In this example, the second set of host registration commands issued from the host 202 to the host 220 was used to create the IG for host 202 HOST1 whereby the IG=I3 and 14 denotes the initiators in the MV1 225 for the host 202 when communicating with the target system 220.

The host 202 may perform processing to discover the new paths I3-T3 and I4-T4 to LUN A. Such processing may include the host 202 issuing one or more commands to LUN A over both newly discovered paths I3-T3 and I4-T4. Successfully issuing such commands from the host may indicate that the host has working connectivity to the LUN A over both such paths and the LUN data is accessible over both such paths. The commands may include control or administrative commands and/or I/O commands (e.g., read and write commands). For example, in one embodiment in which the host 202 issues SCSI commands, the control or administrative commands may include one or more of: test unit read, inquiry and status commands. As part of verification or validation processing, the controller 240 may perform processing to ensure that the target data storage system 220 has received one or more commands directed to the LUN A over the paths I3-T3 and I4-T4 from the host 202. Consistent with discussion herein, the target data storage system 220 only permits I/Os indicated as allowable per defined masking views (MVs) such as MV1 225.

Elements 230*a* and 230*b* may be configured as the same LUN or logical device from the perspective of the host 202. Thus, from the host 202's multipathing perspective, there are 4 paths (I1-T1, I2-T2, I3-T3, I4-T4) to the same LUN A. In at least one embodiment, prior to and during the migration of the data of LUN A, the host 202 may issue I/Os (and other commands) to LUN A 230*a* over only the 2 paths I1-T1, I2-T2 between the host 202 and the source system 210. After the data migration has completed and the controller 240 has verified prior connectivity between the host 202 and target system 220 whereby a cutover is performed from the source system 210 to the target system 220, the host 202 may issue I/Os (and other commands) to LUN A 230*b* over only the 2 paths I3-T3, I4-T4 between the host 202 and the target system 220.

The host registration commands issued from the host 202 to the source system 210 and target system 220 may be in accordance with any supported and defined standard such as the SCSI standard. In at least one embodiment, the host registration command may be vendor unique or vendor defined command in accordance with the SCSI standard.

It should be noted that in at least one existing system not in accordance with techniques herein, the IG associated with a particular host's MV may be imported or copied by the controller 240 from the source system 210 to the target system 220, wherein the target system 220 uses the one or more initiators of the IG in the MV created in the target system 220. In contrast to the existing system, techniques herein provide for having the host 202 perform host registration using host registration commands on both the source system 210 and also the target system 220. In accordance with techniques herein, each of the systems 210 and 220 build their own respective MVs and host registration tables using information provided in connection with registration commands sent to each of the systems 210 and 220. Verification processing performed by the controller 240 includes ensuring that each host registered on the source system 210 is also registered on the target system 220. However, the same host may register on each of the systems 210 and 220 with different initiators specified in the registration commands sent to each of the system 210 and 220.

Figure 7A:
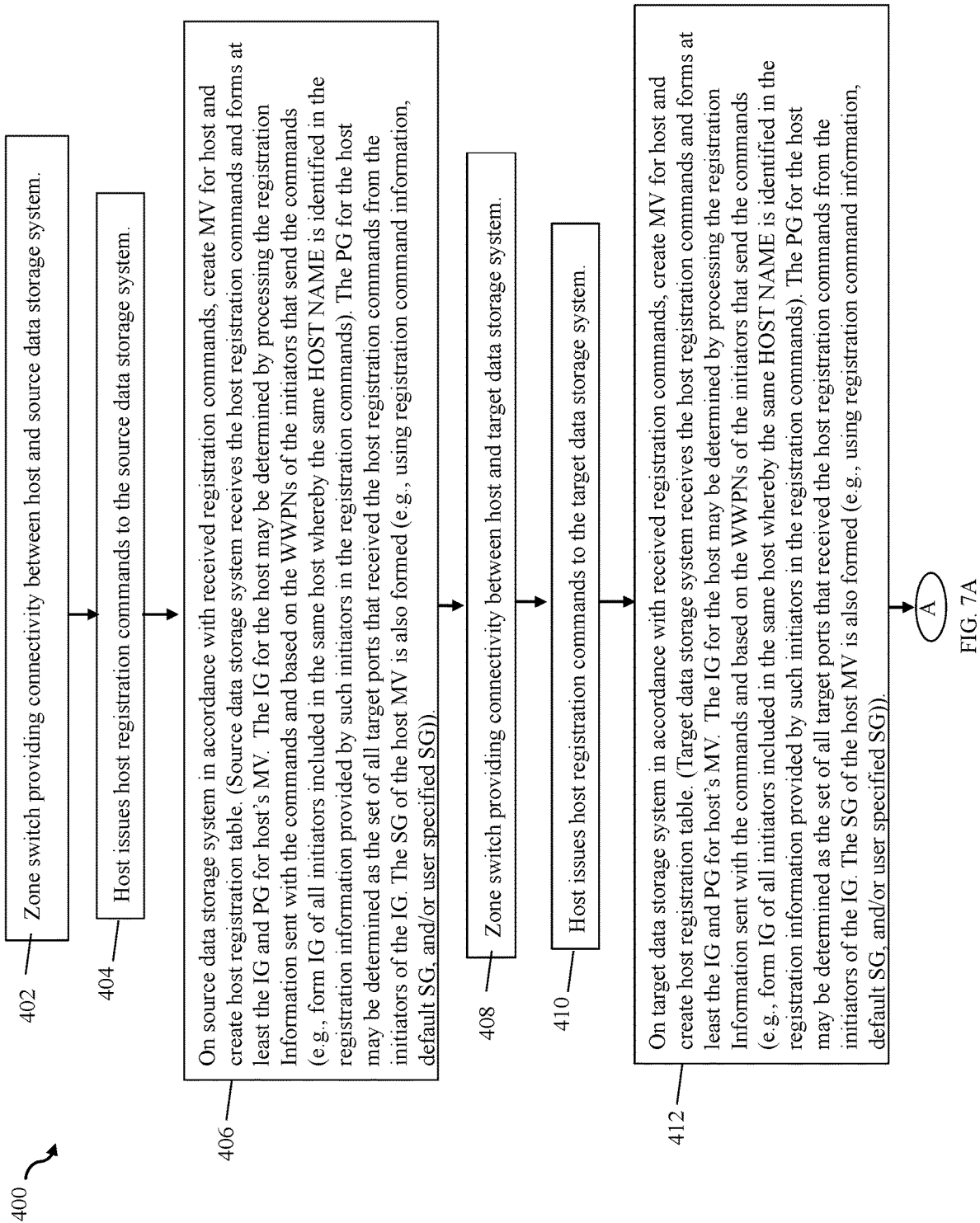
FIGS. 7A and 7B are flowcharts of processing steps that may be performed in an embodiment in accordance with techniques herein.
Figure 7B:
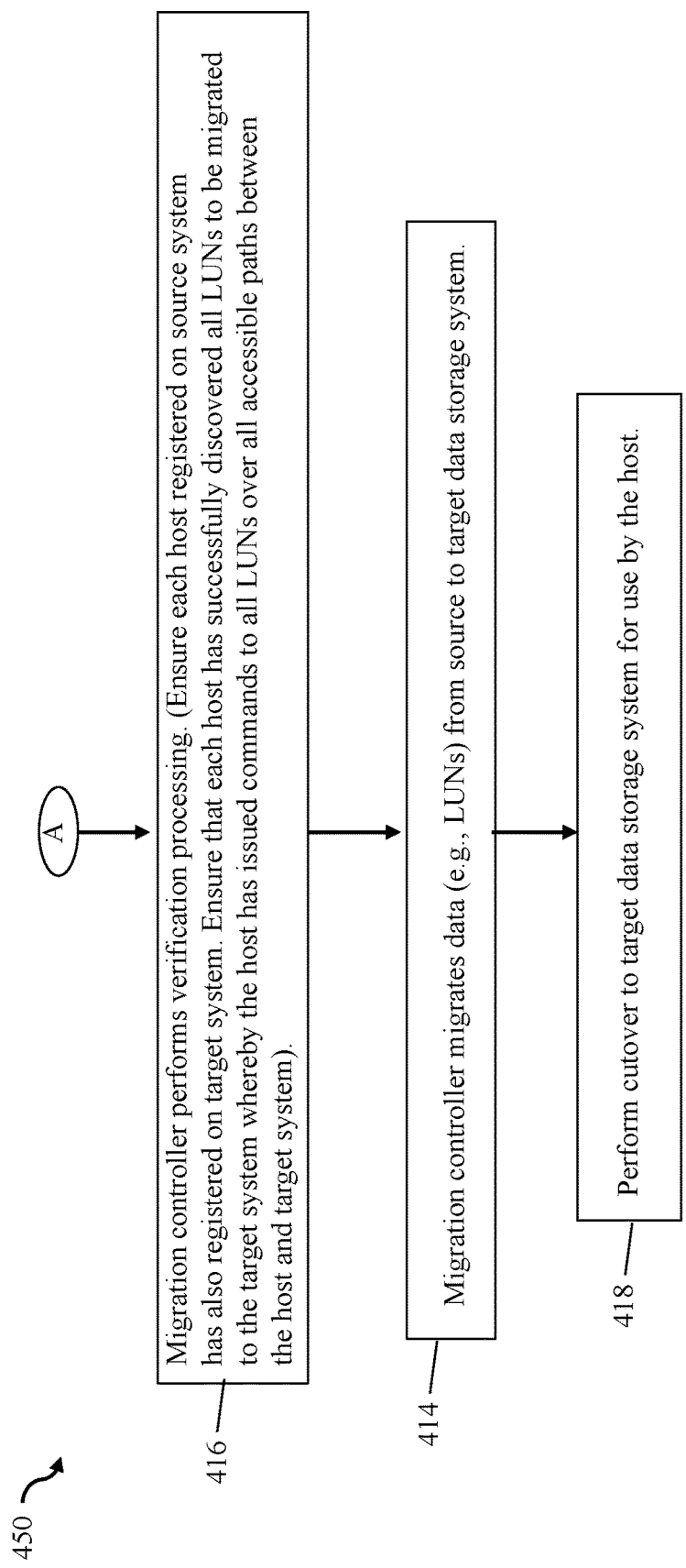

Referring to FIGS. 7A and 7B, shown are flowcharts 400, 450 that may be performed in an embodiment in accordance with techniques herein. The flowcharts 400, 450 summarize processing as described above. At step 402, the switch, or more generally, switching fabric, may be zoned to provide connectivity between the host and source data storage system. From step 402, control proceeds to step 404. At step 404, the host issues registration commands to the source data storage system. From step 404, control proceeds to step 406. At step 406, on the source data storage system in accordance with received registration commands from step 404, create the MV for the host and create the host registration table. Step 406 may include the source data storage system receiving the host registration commands and forming at least the IG and PG for host's MV. The IG for the host's MV may be determined by processing the registration information sent with the commands and based on the WWPNs of the initiators that send the commands (e.g., form IG of all initiators included in the same host whereby the same HOST NAME is identified in the registration information provided by such initiators in the registration commands). The PG for the host's MV may be determined as the set of all target ports that received the host registration commands from the initiators of the IG. The SG of the host MV is also formed, such as, for example, using registration command information, specifying a default SG, and/or having a user specified SG. From step 406, control proceeds to step 408. In step 408, the switch, or more generally, switching fabric, may be zoned to provide connectivity between the host and target data storage system. From step 408, control proceeds to step 410. At step 410, the host issues registration commands to the target data storage system. From step 410, control proceeds to step 412. At step 412, on the target data storage system in accordance with received registration commands from step 410, create the MV for the host and create the host registration table of the target system. Step 412 may include the target data storage system receiving the host registration commands and forming at least the IG and PG for host's MV. The IG for the host's MV may be determined by processing the registration information sent with the commands and based on the WWPNs of the initiators that send the commands (e.g., form IG of all initiators included in the same host whereby the same HOST NAME is identified in the registration information provided by such initiators in the registration commands). The PG for the host's MV may be determined as the set of all target ports that received the host registration commands from the initiators of the IG. The SG of the host MV is also formed, such as, for example, using registration command information, specifying a default SG, and/or having a user specified SG. From step 412, control proceeds to step 416.

At step 416, the migration controller performs verification processing. The verification processing may include ensuring that the each host registered on the source system has also registered on the target system. The verification processing may include ensuring that each host has successfully discovered all LUNs that are to be migrated to the target system whereby the host has issued commands to all LUNs over all accessible paths between the host and target system. Step 416 may also include ensuring that no new or additional hosts are now registered on the target system. In other words, the list of hosts registered on the source system may be expected to exactly match the list of registered hosts on the target system, whereby each host registered on the source system is expected to be registered on the target system. If a host is registered on the source system and not on the target system, the migration controller may generate an error and take appropriate action, such as issue an error message and notification to a user. Additionally, no new or additional host is expected to register on the target system that is not also registered on the source system (e.g., a host registered on the target system but not the source system in connection with migration may be considered an unauthorized host registration and thus disallowed). From step 416, assuming verification processing has been successful, control proceeds to step 414. At step 414, the migration controller migrates data from the source to the target data storage system. For example, for each of the one or more LUNs of the source system, storage may be provisioned on the target system and the data for each such LUN of the source system may be accordingly copied to a corresponding duplicate LUN on the target system. At step 418, processing is performed to cutover to the target system for use by the host rather than use the source system. Step 418 may include, for example, physically disconnecting the source system from the switch or network, configuring or rezoning the switch to remove all paths to the source system, and the like.

Consistent with discussion herein, MVs as described herein may be used by the data storage system to determine whether to service an I/O directed to a LUN where the I/O is sent from a particular initiator of a host to a particular target port of the data storage system. Thus, in one aspect the MV indicates what received I/O operations are allowable and may be serviced by the data storage system. The MV indicates the I/O is allowable and may be serviced if: the I/O is directed to a LUN included in the SG of the MV, the I/O is sent from an initiator of an IG of the MV, and the I/O is received at a target port of the PG of the MV.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing data migration comprising:
receiving, on a source data storage system from a host, first one or more registration commands;
determining, on the source data storage system, a first host registration table including a first corresponding entry for the host, wherein the first corresponding entry identifies first one or more initiators of the host that sent the first one or more registration commands to the source data storage system;
receiving, on a target data storage system, host information including a list of one or more hosts that are identified in the first host registration table of the source data storage system as registered on the source data storage system, wherein the list of the host information identifies the host as registered on the source data storage system, wherein data is migrated for one or more logical devices from the source data storage system to the target data storage system;
issuing second one or more registration commands from the host to the target data storage system;
determining, at the target data storage system in accordance with the second one or more registration commands, a second host registration table including a second corresponding entry for the host, the second corresponding entry denoting a host name for the host and second one or more initiators of the host that sent the one or more registration commands to the target data storage system, wherein the second one or more initiators of the host are different from the first one or more initiators of the host;
determining a masking view for the host on the target data storage system, the masking view including an initiator group of the second one or more initiators of the host that sent the second one or more registration commands from the host to the target data storage system, wherein the masking view is used by the target data storage system to determine whether to service received I/O operations; and
using the host information to perform verification processing that ensures hosts registered on the source data storage system have also registered on the target data storage system.

2. The method of claim 1, further comprising:
migrating data for a first logical device from the source data storage system to the target data storage system;
receiving, at the target data storage system from a first initiator of the host, an I/O command directed to the first logical device; and
determining, in accordance with the masking view, whether to service the I/O command.

3. The method of claim 2, wherein the masking view indicates the I/O command is allowable and serviced by the target data storage system, the first initiator being included in the initiator group of the masking view, the first logical device being included in a storage group of the masking view, and the I/O command is received at a target port of the target data storage system and the target port is included in a target port group of the masking view.

4. The method of claim 1, further comprising performing said verification processing including:
  determining, in accordance with the host information identifying hosts registered on the source data system and in accordance with the second host registration table of the target system, whether each host registered on the source data storage system is also registered on the target data storage system.

5. The method of claim 4, wherein the verification processing further comprises:
  determining, in accordance with the host information identifying hosts registered on the source data system and in accordance with the second host registration table of the target system, whether the host registered on the target data storage system is also registered on the source data storage system.

6. The method of claim 5, wherein each of the second one or more registration commands from the host to the target data storage system include the host name for the host.

7. The method of claim 6, wherein the verification processing includes determining whether the host name for the host as included the second host registration table of the target data storage system matches a host name included in the host information identifying hosts registered on the source data system.

8. The method of claim 7, wherein the verification processing includes ensuring that each host registered on both the target data storage system and the source data storage system has successfully discovered the one or more logical devices migrated from the source data storage system to the target data storage system whereby said each host has successfully issued commands to the one or more logical devices over all accessible paths between the host and the target data storage system.

9. A computer readable medium comprising code stored thereon that, when executed, performs a method of performing data migration comprising:
  receiving, on a source data storage system from a host, first one or more registration commands;
  determining, on the source data storage system, a first host registration table including a first corresponding entry for the host, wherein the first corresponding entry identifies first one or more initiators of the host that sent the first one or more registration commands to the source data storage system;
  receiving, on a target data storage system, host information including a list of one or more hosts that are identified in the first host registration table of the source data storage system as registered on the source data storage system, wherein the list of the host information identifies the host as registered on the source data storage system, wherein data is migrated for one or more logical devices from the source data storage system to the target data storage system;
  issuing second one or more registration commands from the host to the target data storage system;
  determining, at the target data storage system in accordance with the second one or more registration commands, a second host registration table including a second corresponding entry for the host, the second corresponding entry denoting a host name for the host and second one or more initiators of the host that sent the one or more registration commands to the target data storage system, wherein the second one or more initiators of the host are different from the first one or more initiators of the host;
  determining a masking view for the host on the target data storage system, the masking view including an initiator group of the second one or more initiators of the host that sent the second one or more registration commands from the host to the target data storage system, wherein the masking view is used by the target data storage system to determine whether to service received I/O operations; and
  using the host information to perform verification processing that ensures hosts registered on the source data storage system have also registered on the target data storage system.

10. The computer readable medium of claim 9, where the method further comprises:
  migrating data for a first logical device from the source data storage system to the target data storage system;
  receiving, at the target data storage system from a first initiator of the host, an I/O command directed to the first logical device; and
  determining, in accordance with the masking view, whether to service the I/O command.

11. The computer readable medium of claim 10, wherein the masking view indicates the I/O command is allowable and serviced by the target data storage system, the first initiator being included in the initiator group of the masking view, the first logical device being included in a storage group of the masking view, and the I/O command is received at a target port of the target data storage system and the target port is included in a target port group of the masking view.

12. The computer readable medium of claim 9, wherein the method further comprises performing said verification processing including:
  determining, in accordance with the host information identifying hosts registered on the source data system and in accordance with the second host registration table of the target system, whether each host registered on the source data storage system is also registered on the target data storage system.

13. The computer readable medium of claim 12, wherein the verification processing further comprises:
  determining, in accordance with the host information identifying hosts registered on the source data system and in accordance with the second host registration table of the target system, whether the host registered on the target data storage system is also registered on the source data storage system.

14. The computer readable medium of claim 13, wherein each of the second one or more registration commands from the host to the target data storage system include the host name for the host.

15. The computer readable medium of claim 14, wherein the verification processing includes determining whether the host name for the host as included the second host registration table of the target data storage system matches a host name included in the host information identifying hosts registered on the source data system.

16. The method of claim 15, wherein the verification processing includes ensuring that each host registered on both the target data storage system and the source data storage system has successfully discovered the one or more logical devices migrated from the source data storage system to the target data storage system whereby said each host has successfully issued commands to the one or more logical devices over all accessible paths between the host and the target data storage system.

17. A system comprising:
one or more processors; and
one or more memories comprising code stored thereon that, when executed by at least a first of the one or more processors, performs a method of data migration comprising:
receiving, on a source data storage system from a host, first one or more registration commands;
determining, on the source data storage system, a first host registration table including a first corresponding entry for the host, wherein the first corresponding entry identifies first one or more initiators of the host that sent the first one or more registration commands to the source data storage system;
receiving, on a target data storage system, host information including a list of one or more hosts that are identified in the first host registration table of the source data storage system as registered on the source data storage system, wherein the list of the host information identifies the host as registered on the source data storage system, wherein data is migrated for one or more logical devices from the source data storage system to the target data storage system;
issuing second one or more registration commands from the host to the target data storage system;
determining, at the target data storage system in accordance with the second one or more registration commands, a second host registration table including a second corresponding entry for the host, the second corresponding entry denoting a host name for the host and second one or more initiators of the host that sent the one or more registration commands to the target data storage system, wherein the second one or more initiators of the host are different from the first one or more initiators of the host;
determining a masking view for the host on the target data storage system, the masking view including an initiator group of the second one or more initiators of the host that sent the second one or more registration commands from the host to the target data storage system, wherein the masking view is used by the target data storage system to determine whether to service received I/O operations; and
using the host information to perform verification processing that ensures hosts registered on the source data storage system have also registered on the target data storage system.

18. The system of claim 17, wherein the method further comprises:
migrating data for a first logical device from the source data storage system to the target data storage system;
receiving, at the target data storage system from a first initiator of the host, an I/O command directed to the first logical device; and
determining, in accordance with the masking view, whether to service the I/O command.

19. The system of claim 18, wherein the masking view indicates the I/O command is allowable and serviced by the target data storage system, the first initiator being included in the initiator group of the masking view, the first logical device being included in a storage group of the masking view, and the I/O command is received at a target port of the target data storage system and the target port is included in a target port group of the masking view.

20. The system of claim 17, wherein the method further comprises performing said verification processing including:
determining, in accordance with the host information identifying hosts registered on the source data system and in accordance with the second host registration table of the target system, whether each host registered on the source data storage system is also registered on the target data storage system.

* * * * *